(12) United States Patent
Kim (10) Patent No.: US 7,437,836 B2
(45) Date of Patent: Oct. 21, 2008

(54) INSOLE ASSEMBLY FOR INCREASING WEIGHT OF FOOTWEAR AND HEAVY FOOTWEAR HAVING WEIGHT-INCREASING MIDSOLE/OUTSOLE

(75) Inventor: Hee Suk Kim, Kimhae (KR)

(73) Assignee: Aison Co., Ltd. (KR)

( * ) Notice: Subject to any disclaimer, the term of this patent is extended or adjusted under 35 U.S.C. 154(b) by 0 days.

(21) Appl. No.: 11/824,710

(22) Filed: Jul. 2, 2007

(65) Prior Publication Data

US 2007/0245594 A1 Oct. 25, 2007

Related U.S. Application Data

(63) Continuation of application No. 10/822,494, filed on Apr. 12, 2004, now abandoned.

(30) Foreign Application Priority Data

Dec. 22, 2003 (KR) ............................... 2003-94999
Jan. 30, 2004 (KR) ............................... 2004-6196

(51) Int. Cl.
*A43B 5/00* (2006.01)
(52) U.S. Cl. .................. 36/44; 36/3 R; 36/3 B; 36/132
(58) Field of Classification Search .............. 36/43, 36/44, 3 R, 3 B, 132, 114
See application file for complete search history.

(56) References Cited

U.S. PATENT DOCUMENTS

| | | | | |
|---|---|---|---|---|
| 568,068 A | * | 6/1896 | Hilgert | 36/3 R |
| 1,260,942 A | * | 3/1918 | Price | 36/3 R |
| 1,852,883 A | * | 4/1932 | Gustaveson | 36/3 R |
| 3,225,463 A | * | 12/1965 | Burnham | 36/3 B |
| 3,475,836 A | * | 11/1969 | Brahm | 36/3 R |
| 3,624,930 A | * | 12/1971 | Johnson | 36/43 |
| 3,716,930 A | * | 2/1973 | Brahm | 36/3 B |
| 4,020,570 A | * | 5/1977 | Shames | 36/44 |
| 4,252,315 A | | 2/1981 | Kimura | |
| 4,709,921 A | | 12/1987 | Valuikas et al. | |
| 5,195,254 A | * | 3/1993 | Tyng | 36/3 R |
| 5,285,583 A | | 2/1994 | Aleven | |
| 5,333,397 A | * | 8/1994 | Hausch | 36/3 B |
| 5,542,196 A | | 8/1996 | Kantro | |
| 5,625,965 A | * | 5/1997 | Blissett et al. | 36/43 |
| 5,638,613 A | | 6/1997 | Williams | |
| 5,894,687 A | * | 4/1999 | Lin | 36/141 |
| 5,976,100 A | * | 11/1999 | Greenawalt | 602/66 |

(Continued)

FOREIGN PATENT DOCUMENTS

JP 10-165203 A 6/1998

(Continued)

*Primary Examiner*—Marie Patterson
(74) *Attorney, Agent, or Firm*—The Webb Law Firm, P.C.

(57) ABSTRACT

An insole assembly for increasing the weight of footwear and a heavy footwear having an outsole and/or a midsole made of a high specific gravity compressed resin to enhance exercise effect. The insole assembly includes a lower insole made of a compressed resin having a high specific gravity; an upper insole laid on the lower insole and a shock-absorbing member attached to a heel of the lower insole. The insole assembly is made of a compressed resin to increase the weight of the footwear to which the insole assembly is applied.

11 Claims, 13 Drawing Sheets

U.S. PATENT DOCUMENTS

| | | | |
|---|---|---|---|
| 6,199,304 B1 | 3/2001 | Ludemann | |
| 6,341,434 B1 | 1/2002 | Yeh | |
| 6,343,426 B1 | 2/2002 | Robbins | |
| 6,502,331 B2 | 1/2003 | Hines | |
| 6,519,878 B2 | 2/2003 | Yoshiaki | |
| 6,589,630 B1 | 7/2003 | Crow | |
| 6,701,639 B2 * | 3/2004 | Treptow et al. | 36/2.6 |
| 6,715,219 B2 | 4/2004 | Bock | |
| 6,854,199 B2 | 2/2005 | Polifroni | |
| 7,053,144 B1 | 5/2006 | Immel | |
| 7,331,121 B2 * | 2/2008 | Lo | 36/3 R |
| 2001/0016991 A1 * | 8/2001 | Sartor | 36/3 B |
| 2002/0007569 A1 | 1/2002 | Crane et al. | |
| 2002/0011011 A1 | 1/2002 | Vaz | |
| 2002/0017039 A1 | 2/2002 | Hines | |
| 2002/0050079 A1 | 5/2002 | Yoshiaki | |
| 2005/0005473 A1 * | 1/2005 | Oh | 36/29 |

FOREIGN PATENT DOCUMENTS

| | | |
|---|---|---|
| JP | 2000-312602 A | 11/2000 |
| JP | U3077155 A | 2/2001 |
| KR | 10-0230113 B1 | 11/1999 |
| KR | 20-0285242 A | 7/2002 |
| KR | 20-0298008 A | 11/2002 |
| KR | 10-0431051 B1 | 4/2004 |

* cited by examiner

INSOLE ASSEMBLY FOR INCREASING WEIGHT OF FOOTWEAR AND HEAVY FOOTWEAR HAVING WEIGHT-INCREASING MIDSOLE/OUTSOLE

CROSS-REFERENCE TO RELATED APPLICATION

This application claims priority to U.S. patent application Ser. No. 10/822,494 filed Apr. 12, 2004 now abandoned, which is incorporated by reference herein in its entirety.

1. TECHNICAL FIELD

The present invention relates to heavy footwear having increased weight. More particularly, the present invention relates to an insole assembly made of compressed resin for potentially increasing the weight of footwear to which the insole assembly is applied. Further, the present invention relates to heavy footwear including an outsole and/or a midsole made of a compressed resin having a high specific gravity to enhance the exercise effect.

2. BACKGROUND ART

Various techniques have been proposed, which can increase the weight of footwear if necessary to enhance the exercise effect of a wearer while keeping the weight decreased at normal times.

An example of such techniques is disclosed in Korean Registered Utility Model Serial No. 285242, entitled "Sports Shoes for Exercise". According to this document, heavy metal members are detachably inserted into an outsole or a bottomsole as the outer bottom portion of the footwear in order to enhance the exercise effect of a wearer.

Another example is disclosed in Korean Registered Utility Model Serial No. 298008, entitled "Weight Adjustable Footwear Liner", proposed by the inventor. This document proposed insertion of metal members into an insole or liner, which is put in a footwear body, to increase the weight of the footwear thereby enhancing the exercise effect of a wearer.

According to the conventional techniques, high specific gravity material such as metal, which is inserted into the outsole or the insole for increasing the weight of shoes, lowers the shoes' ability of absorbing the load impact applied to a wearer thereby requiring additional shock-absorbing means.

Because additional molds as well as fabrication and assembly processes are necessary in order to provide a detachable structure for the weight-increasing insert members, the prior arts have another drawback that increases fabrication time and cost.

The insert members made of metal cause inconvenience to a person in the above footwear or shoes that he/she should take off the shoes or separate the metal members from the shoes when passing through an airport scanner.

Also, the shoes may be soiled from the rust of the metal members when water-washed in a washing machine.

Furthermore, if the shoes are used for a predetermined time period, the rubber outsoles are abraded, exposing the metal members, which, in turn, collide against the ground, creating unpleasant noises.

Therefore, there is a need for novel means that can overcome the foregoing problems while adjusting the weight of shoes.

SUMMARY OF THE INVENTION

It is therefore an object of the invention to provide an insole assembly which can increase the weight of footwear when attached to the footwear.

It is another object of the invention to provide an insole which is molded from heavy compressed resin to impart a desired level of body load-absorbing ability to the footwear without additional shock-absorbing means.

It is a further objection of the invention to insert a weight-increasing member into a midsole and/or an outsole to increase the weight of the footwear.

It is yet another object of the invention to fabricate a midsole and/or an outsole from a high specific gravity compressed resin to increase the weight of the footwear.

According to an aspect of the invention for realizing the above objects, there is provided an insole assembly used for increasing the weight of footwear comprising: a lower insole made of a compressed resin having a high specific gravity, and an upper insole laid on the lower insole.

It is preferred that the lower insole is made of a compression molded resin.

It is also preferred that the compression molded resin has a specific gravity of at least 2.

The insole assembly may further comprise a shock-absorbing member attached to a rear end of the upper insole.

According to another aspect of the invention for realizing the above objects, there is provided a heavy weight footwear comprising: a body for housing a foot, an outsole connected to the body for supporting the foot, at least a portion of the outsole being made of a compressed resin having a high specific gravity, and an insole laid on the outsole within the body.

It is preferred that the whole part of the outsole is made of the high specific gravity compressed resin.

It is also preferred that the high specific gravity compressed resin is inserted into the outsole.

The heavy weight footwear may further comprise a midsole laid between the outsole and the body, at least a portion of the midsole being made of a high specific gravity compressed resin.

It is preferred that the whole part of the midsole is made of the high specific gravity compressed resin.

It is also preferred that the high specific gravity compressed resin is inserted into the midsole.

According to a further aspect of the invention for realizing the above objects, there is provided a heavy weight footwear comprising: a body for housing a foot; a midsole connected to the body for supporting the foot, at least a portion of the outsole being made of a compressed resin having a high specific gravity; an outsole attached to an underside of the midsole; and an insole laid on the midsole within the body.

It is preferred that the whole part of the midsole is made of the high specific gravity compressed resin.

It is also preferred that the high specific gravity compressed resin is inserted into the midsole.

DETAILED DESCRIPTION OF THE INVENTION

The foregoing and other features and advantages of the invention will be described in detail with reference to the accompanying drawings.

Figure 1:
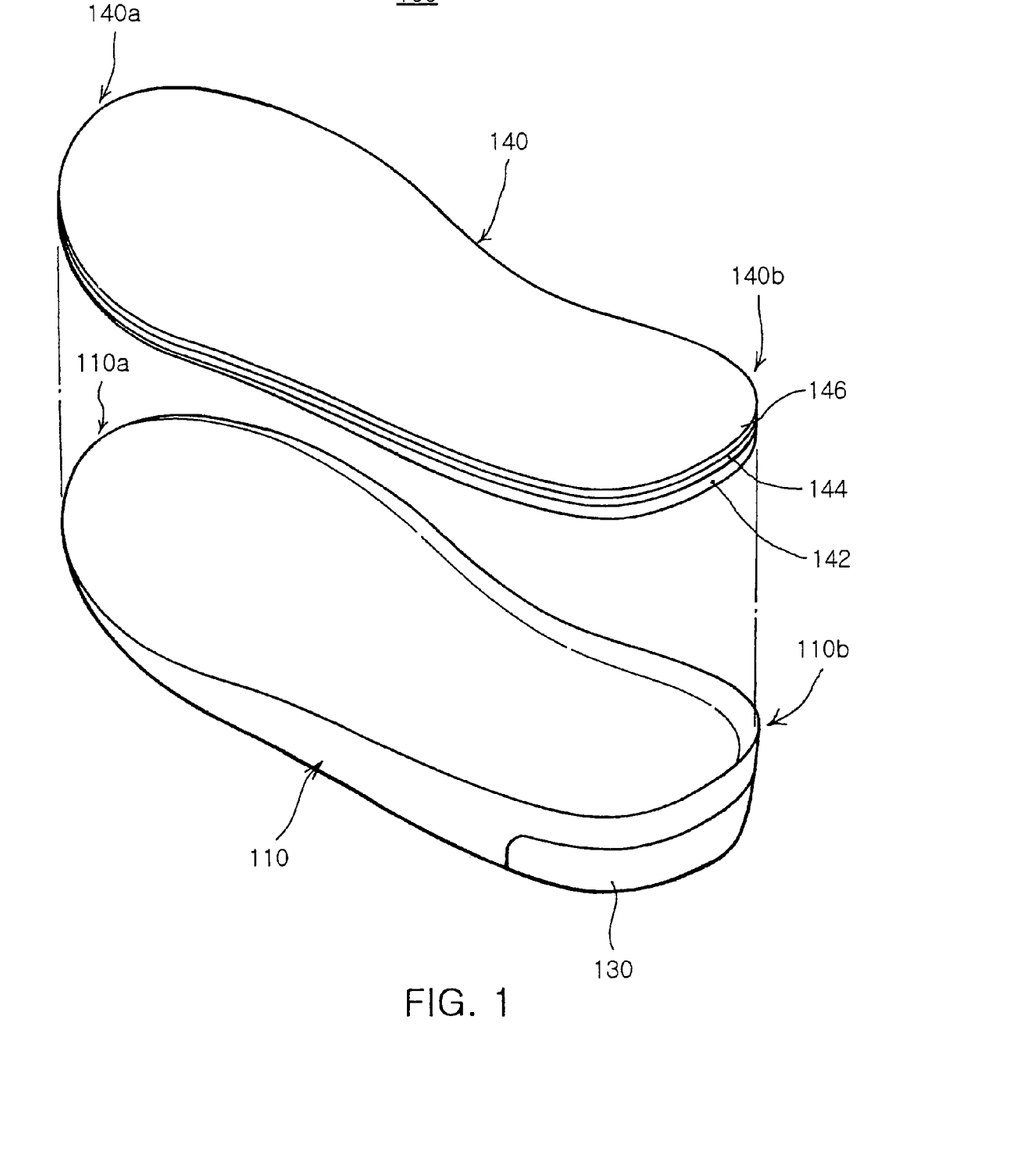
FIG. 1 is an exploded perspective view of an insole assembly for increasing the weight of footwear according to a first embodiment of the invention.

FIG. 1 is an exploded perspective view of an insole assembly for increasing the weight of footwear, for example, a shoe according to a first embodiment of the invention.

Referring to FIG. 1, the insole assembly 100 of the invention includes a weight insole or a lower insole 110 made of a compressed resin having a high specific gravity for increasing the weight of a shoe, a shock-absorbing member 130 attached to the heel of the lower insole 110 and an upper insole 140 laid on the lower insole 110.

The weight insole or lower insole 110 embodying the essential concept of the invention is made by compression molding a desired resin up to a specific gravity of about at least 2. The resin contains nitrile rubber, butadiene rubber, barium sulfate ($BaSO_4$) as high specific gravity filler, red lead oxide ($Pb_3O_4$), ZnO, S, stearic acid and vulcanizing accelerator. Alternatively, the resin can be pressed and then cut and processed into the form of an insole to fabricate the insole.

The high specific gravity lower insole 110 may be fabricated separate from the shoe so that it can be detachably attached to the shoe, or integrally attached to the shoe via adhesive and so on if necessary.

The shock-absorbing member 130 is attached to the heel or the rear end 110b of the lower insole 110, and made of an elastic material capable of absorbing the impact load applied to a wearer during his/her movement. Further, the rear corner of the shock-absorbing member is rounded to more effectively absorb the shock during stepping as well as ensure comfortable walking.

The upper insole 140 includes a support portion 142 placed on the lower insole 110, an elastic portion 144 laid on the support portion 142 and a foot-sole contact portion 146 laid on the elastic portion 144 to contact a wearer's foot-sole.

The support portion 142 is made of, for example, ethylene Vinylacetate copolymer (EVA) at a predetermined thickness to prevent the distortion (e.g., abduction or adduction of a wearer's foot. Alternatively, the support portion 142 may be made of an elastic material at a desired thickness to keep the wearer comfortable.

The elastic portion 144 is made of a soft material to absorb shock and so on.

The contact portion 146 is made of a soft material such as a thin cloth to absorb sweat from the foot while keeping the wearer comfortable, and attached on the elastic portion 144 via adhesive.

When the insole assembly 100 is used in a shoe to increase its weight, the lower insole 110 of a desired weight is inserted into the shoe, and then the upper insole 140 is put on the lower insole 110 in the show, with front and rear ends 140a and 140b of the upper insole 140 aligned with front and rear ends 110a and 110b of the lower insole 110.

Figure 2:
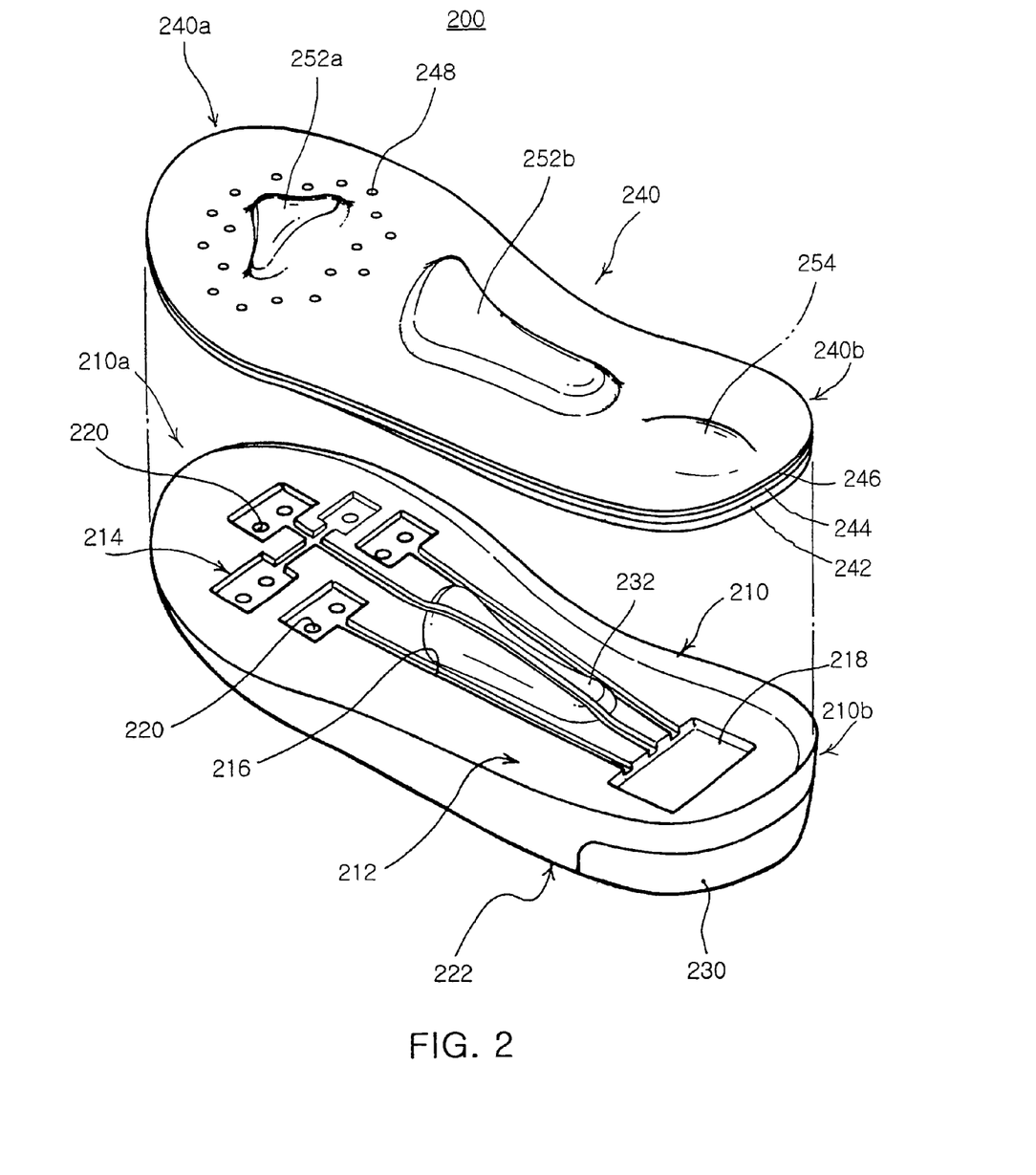
FIG. 2 is an exploded perspective view of an insole assembly for increasing the weight of footwear according to a second embodiment of the invention.

FIG. 2 is an exploded perspective view of an insole assembly for increasing the weight of footwear according to a second embodiment of the invention.

As shown in FIG. 2, the insole assembly 200 of the invention includes a weight insole or a lower insole 210 made of a compressed resin having a high specific gravity for increasing the weight of a footwear or a shoe, a shock-absorbing member 230 attached to the heel of the lower insole 210 and an upper insole 240 laid on the lower insole 210.

The lower insole 210 is made of the same material as the lower insole 110 of the first embodiment, but modified with its configuration.

Figure 3:
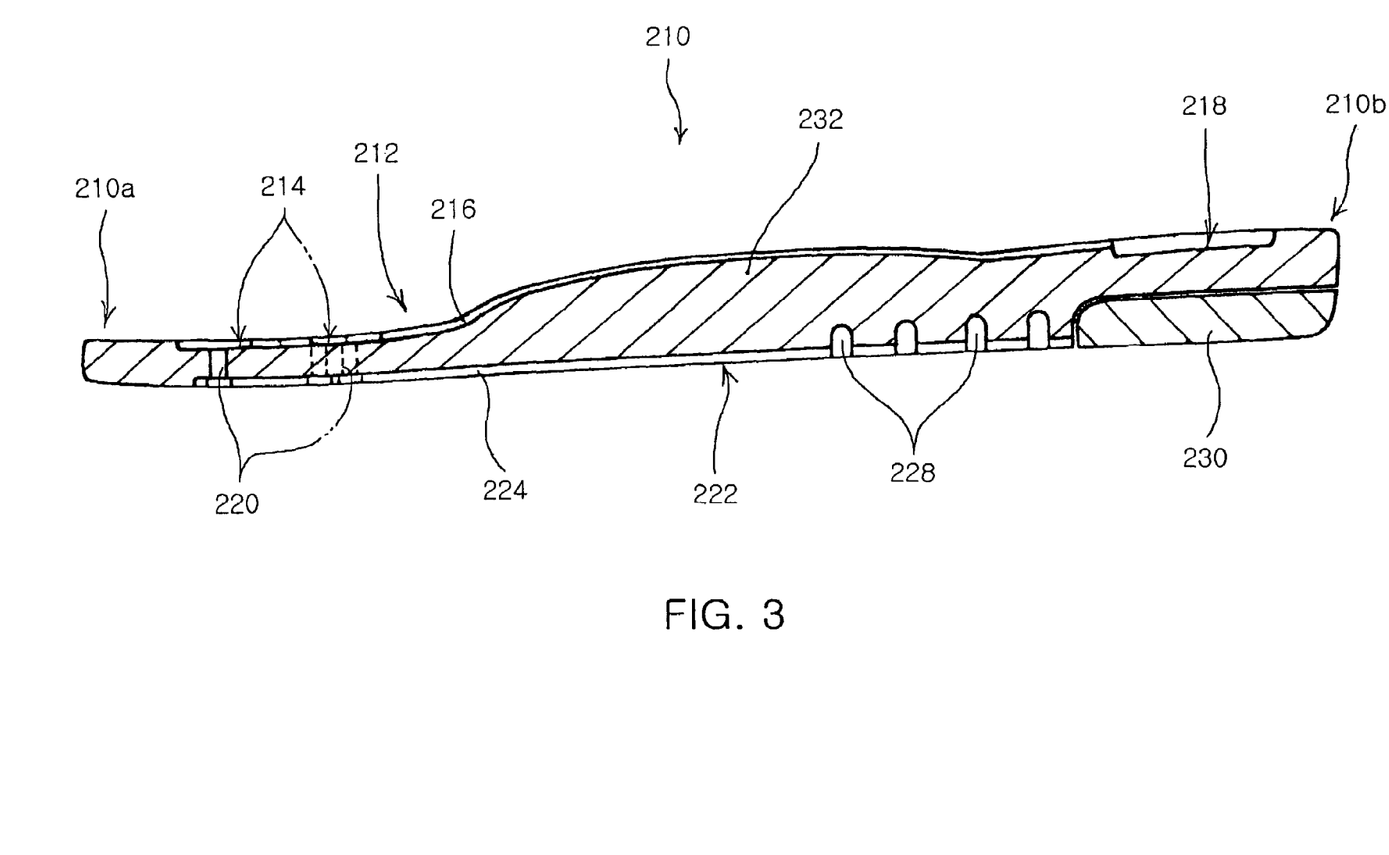
FIG. 3 is a sectional view of a lower insole shown in FIG. 2.
Figure 4:
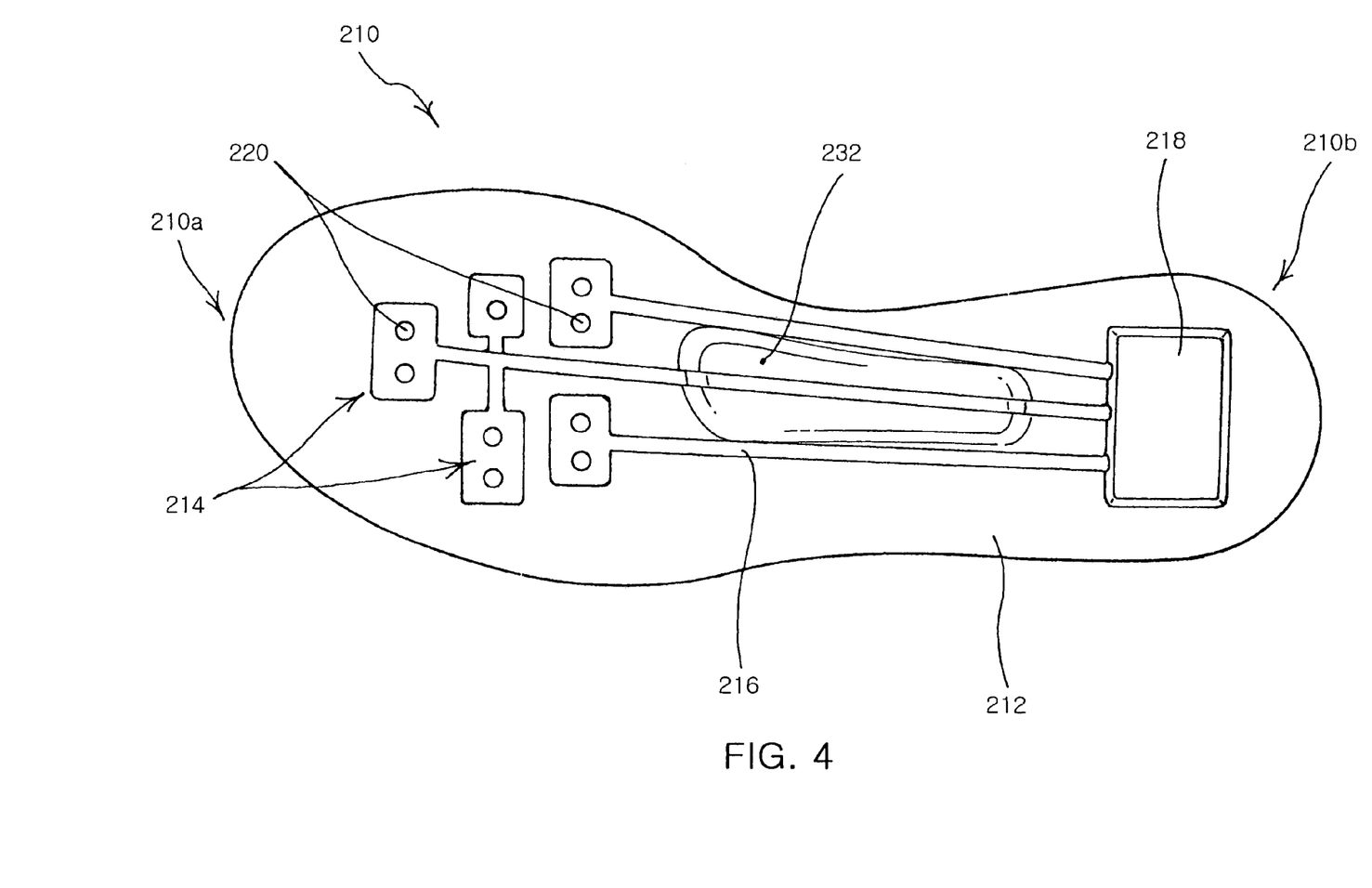
FIG. 4 is a plan view of the lower insole of FIG. 3.
Figure 5:
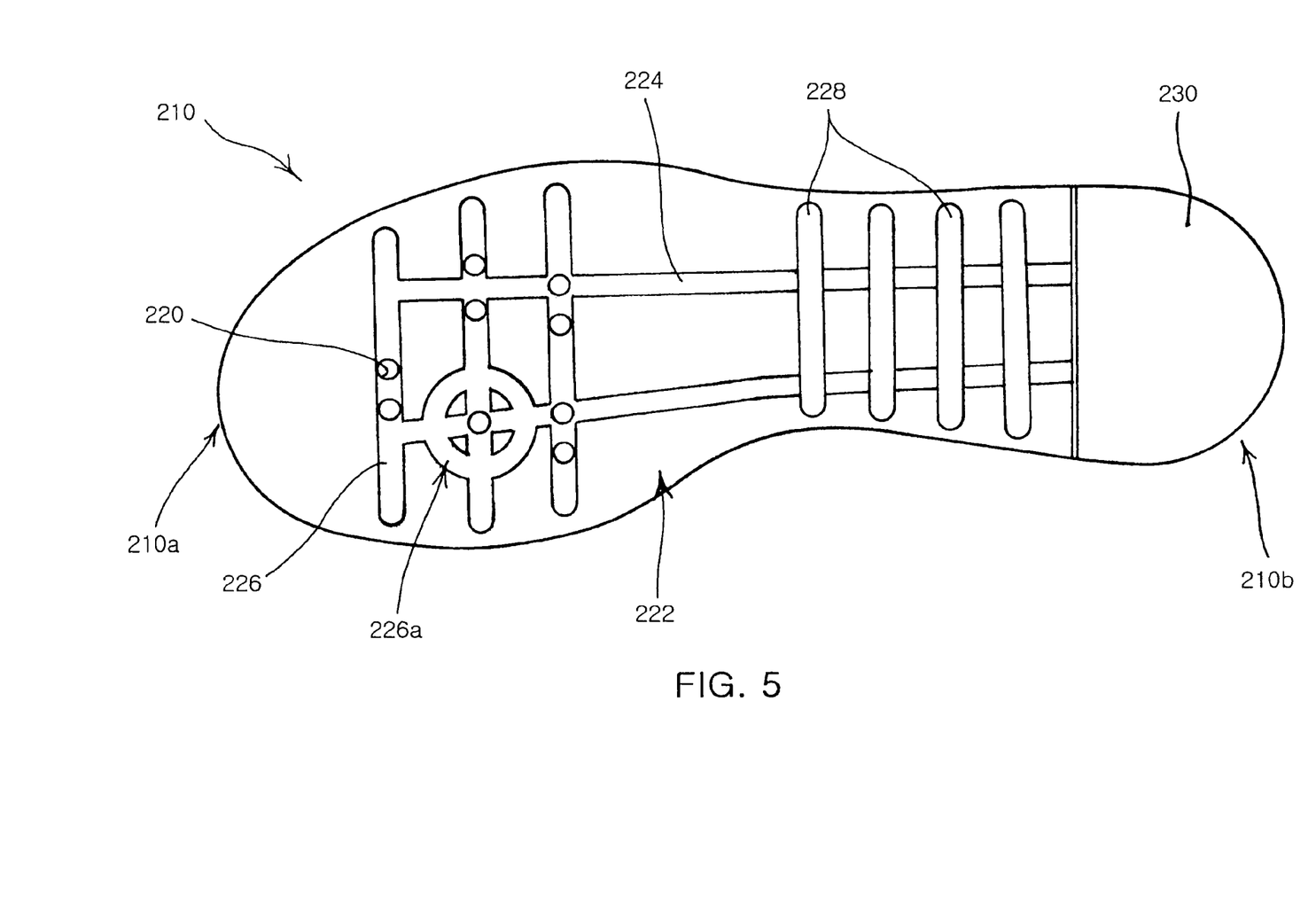
FIG. 5 is a bottom view of the lower insole of FIG. 3.

Hereinafter the lower insole 210 will be described with reference in FIGS. 3 to 5, wherein FIG. 3 is a sectional view of a lower insole shown in FIG. 2, FIG. 4 is a plan view of FIG. 3, and FIG. 5 is a bottom view of FIG. 3.

As shown in FIGS. 3 to 5, the lower insole 210 is provided in a top surface 212 with a plurality of front concave portions 214, a rear concave portion 218 and a plurality of longitudinal grooves 216 for connecting the concave portions 214 and 218.

The rear concave portion 218 is engraved or recessed from the top surface 212 to absorb any landing impact. Also, the rear concave portion 218 is connected with the front concave portions 214 via the grooves 216 so that the pressure applied to the rear concave portion 218 during stepping forces air to circulate from the rear concave portion 218 through the grooves 216 toward the front concave portions 214 in a shoe while evaporating sweat and dispersing heat from the foot in the shoe.

There are a plurality of exposed vertical through holes 220 in the front concave portions 218. The through holes 220 are connected to a plurality of lateral grooves 226 formed in an underside 222 of the lower insole 210. Longitudinal grooves 224 are connected with bottom concave portions 228, which are formed in a central portion of the underside 222, and function as channels for flowing air from the concave portions 228 toward the vertical through holes 220.

In a region of the shoe, to which load is mainly applied from a front region of the foot, a circular concave portion 226a is provided to form an air channel to absorb landing pressure and impact.

The shock-absorbing member 230 is attached to the heel of the lower insole 210, and made of an elastic member to absorb impact load applied to a wearer during his/her movement. Further, the rear corner of the shock-absorbing member is rounded to more effectively absorb the shock during stepping as well as ensure comfortable walking.

The lower insole 210 is provided with a convex portion 232 in a central portion of the top surface 212. The convex portion 232 supports the metatarsus while functioning as a cushion together with a lower concave portion 254 of the upper insole 240, which will be described later.

Figure 6:
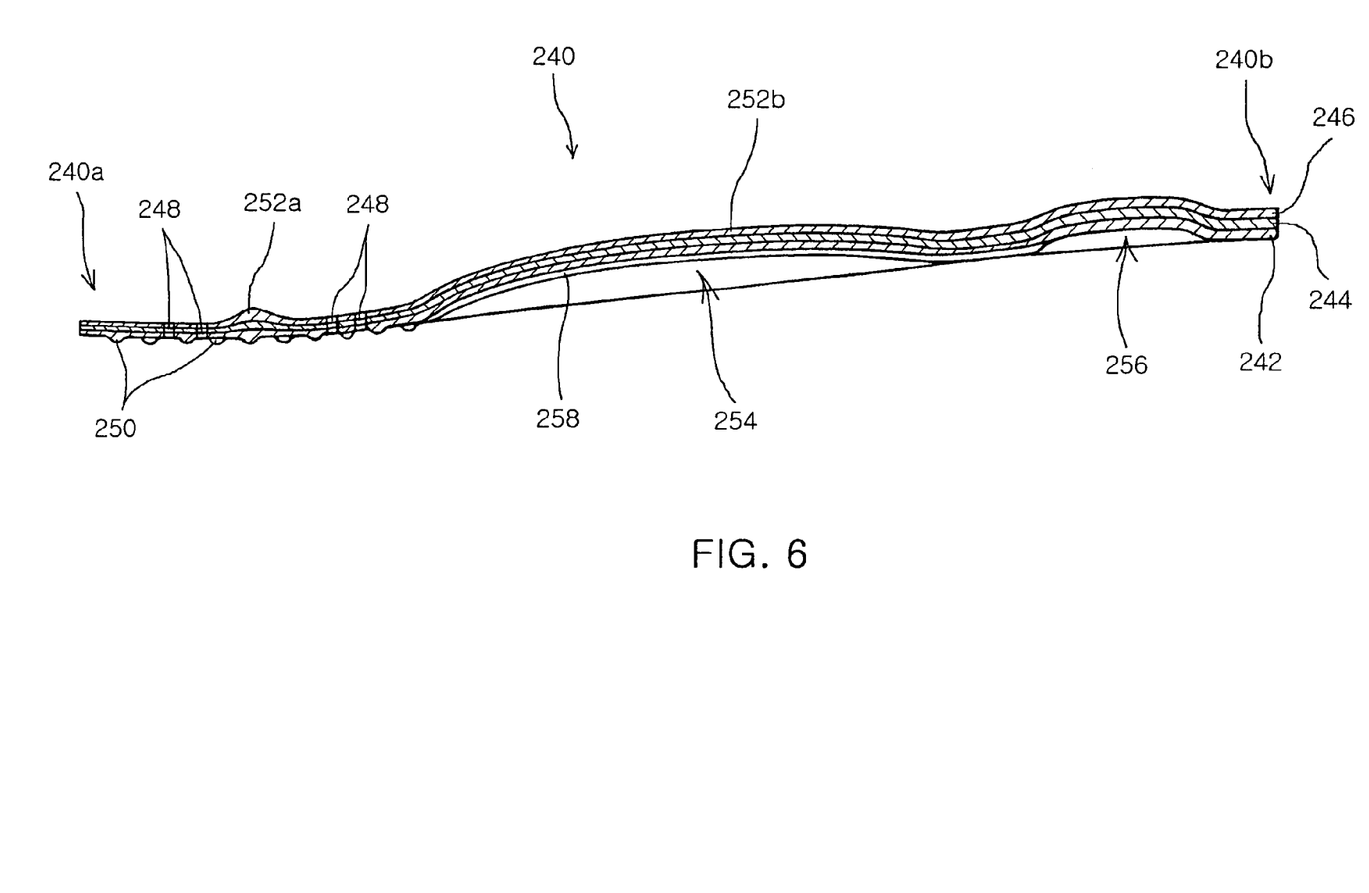
FIG. 6 is a sectional view of an upper insole shown in FIG. 2.
Figure 7:
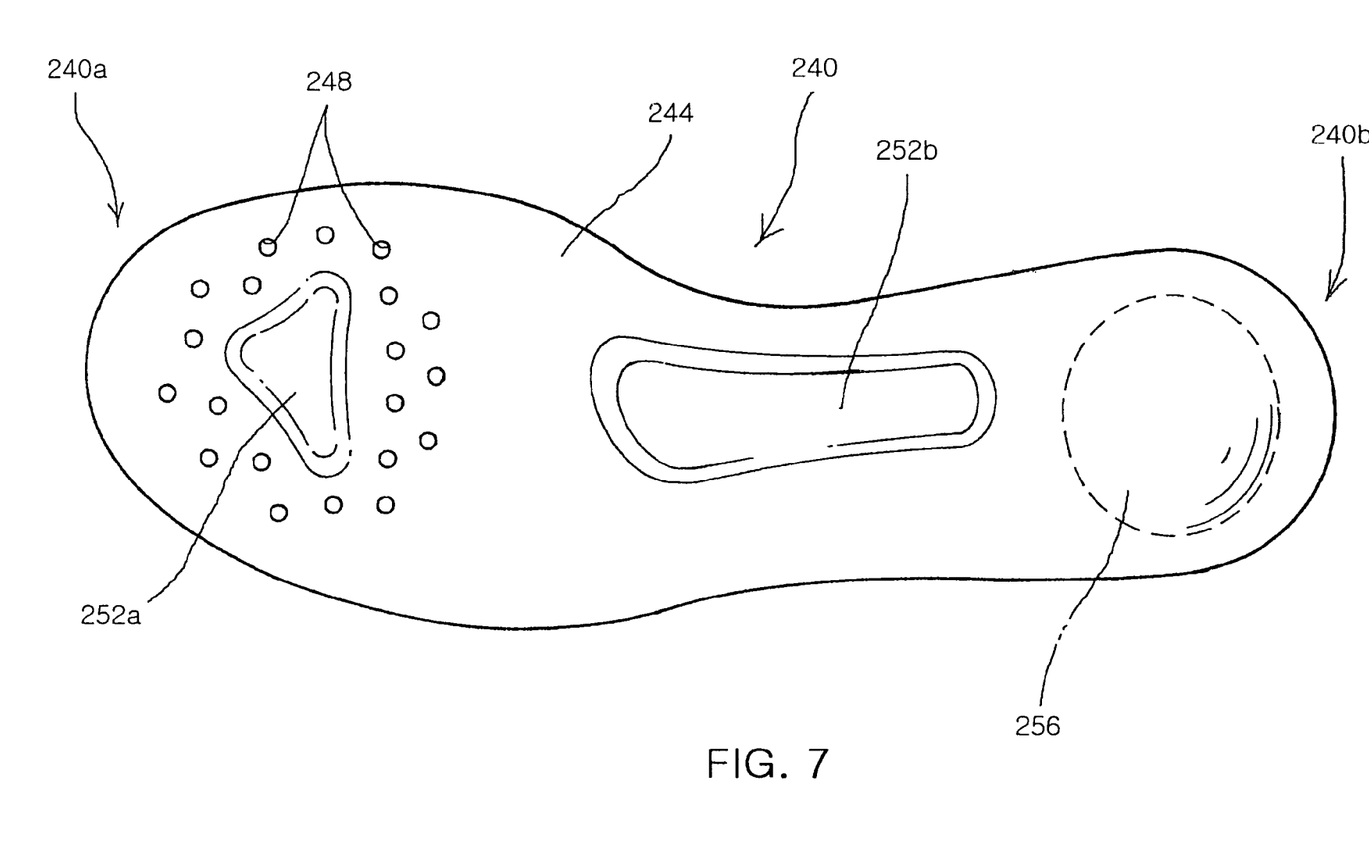
FIG. 7 is a plan view of the upper insole of FIG. 6.
Figure 8:
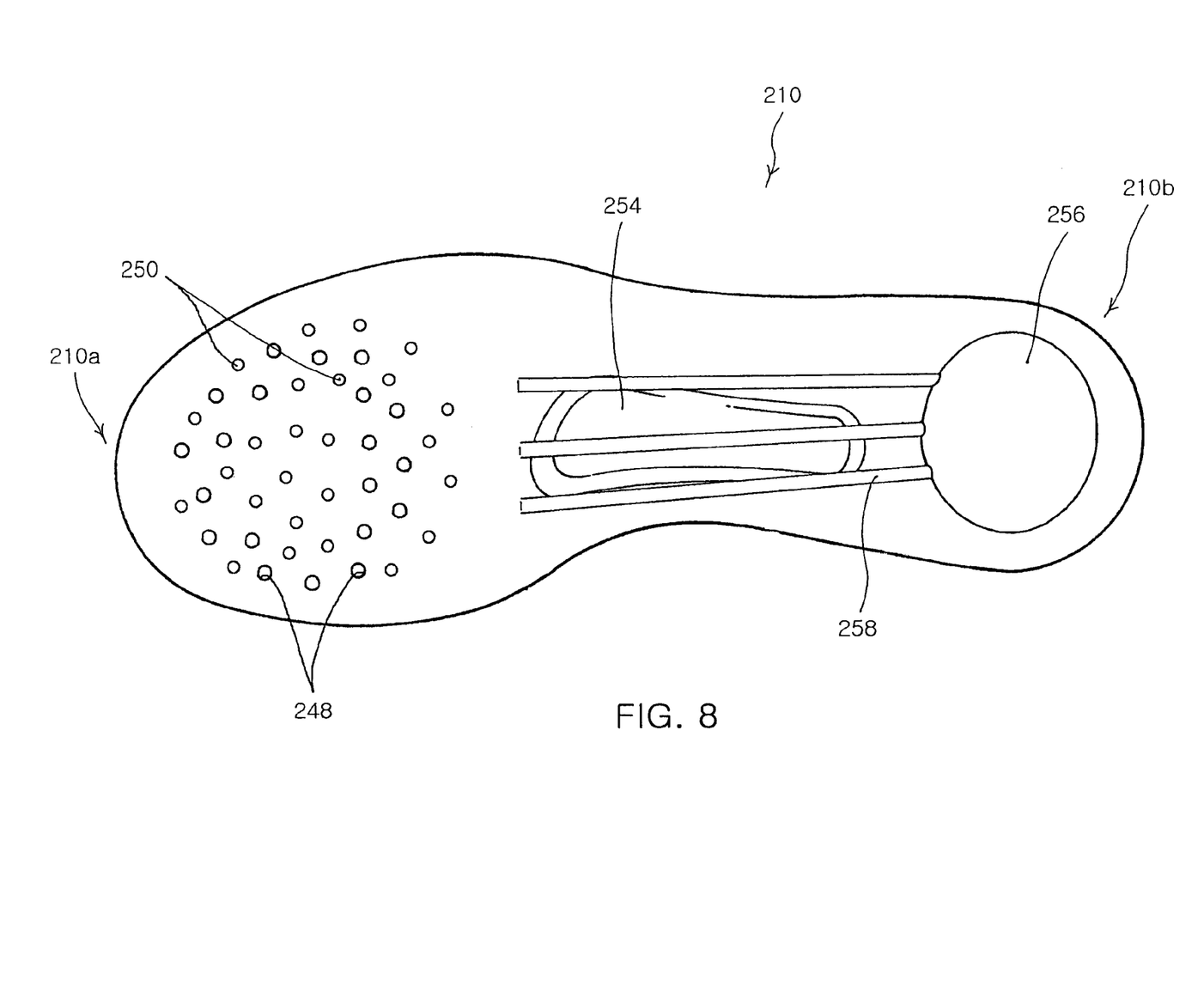
FIG. 8 is a bottom view of the upper insole of FIG. 6.

Hereinafter the upper insole 240 will be described with reference to FIGS. 6 and 8, wherein FIG. 6 is a sectional view of an upper insole shown in FIG. 2, FIG. 7 is a plan view of FIG. 6, and FIG. 8 is a bottom view of FIG. 6.

The upper insole 240 integrally has a support portion 242 attached on the lower insole 210, an elastic portion 244 laid on the support portion 242 and a foot-sole contact portion 246 Laid on the elastic portion 244 to contact a wearer's foot-sole.

The support portion 242 is made of, for example, EVA at a predetermined thickness to prevent the distortion of a wearer's foot. Alternatively, the support portion 242 may be made of an elastic material at a desired thickness to keep the wearer comfortable.

The elastic portion 244 is made of a soft material to absorb shock and so on.

The contact portion 246 is made of a soft material such as a thin cloth to absorb sweat from the foot while keeping the wearer comfortable, and attached on the elastic portion 244 via adhesive.

The upper insole 240 has an anti-slip projection 252a extended from a top front portion adjacent to a front end 240a. The upper insole 240 also has a plurality of vent holes 248 formed adjacent to the front end 240a and a plurality of downward projections 250 formed in a front bottom thereof. Then, the projections 250 contact the top surface 212 of the lower insole 210 to form a space between the underside of the upper insole 240 and the top surface 212 of the lower insole 210 through which air can flow when the wearer is walking. As a result, this circulates the air through the shoe to evaporate sweat and disperse heat from the foot.

The upper insole 240 is provided with a convex portion 252b extended longitudinally in a middle portion of the top surface of the upper insole 240. The convex portion 252b supports the metatarsus of the foot to disperse the load across the bottom of the shoe. The bottom of the convex portion 252b forms a concave portion 254 to receive the convex portion 232 of the lower insole 210, thereby supporting the metatarsus together with the convex portion 232.

A hollow space 256 is formed in the bottom of the upper insole 240 adjacent to the rear end 240b that is touched by the heel of the wearer. The hollow space 256 is located corresponding to the rear concave portion 218 of the lower insole 210, and three grooves 258 are formed preferably corresponding to the upper grooves 218 of the lower insole 210. The hollow space 256 shrinks when stepped on, pushing the air forward to flow from the hollow space 256 through the grooves 258 and 216 and spouts out through the vent holes 248 toward the front portion of the foot. In this fashion, air circulates in the shoe while evaporating sweat and dispersing heat from the foot.

Figure 9:
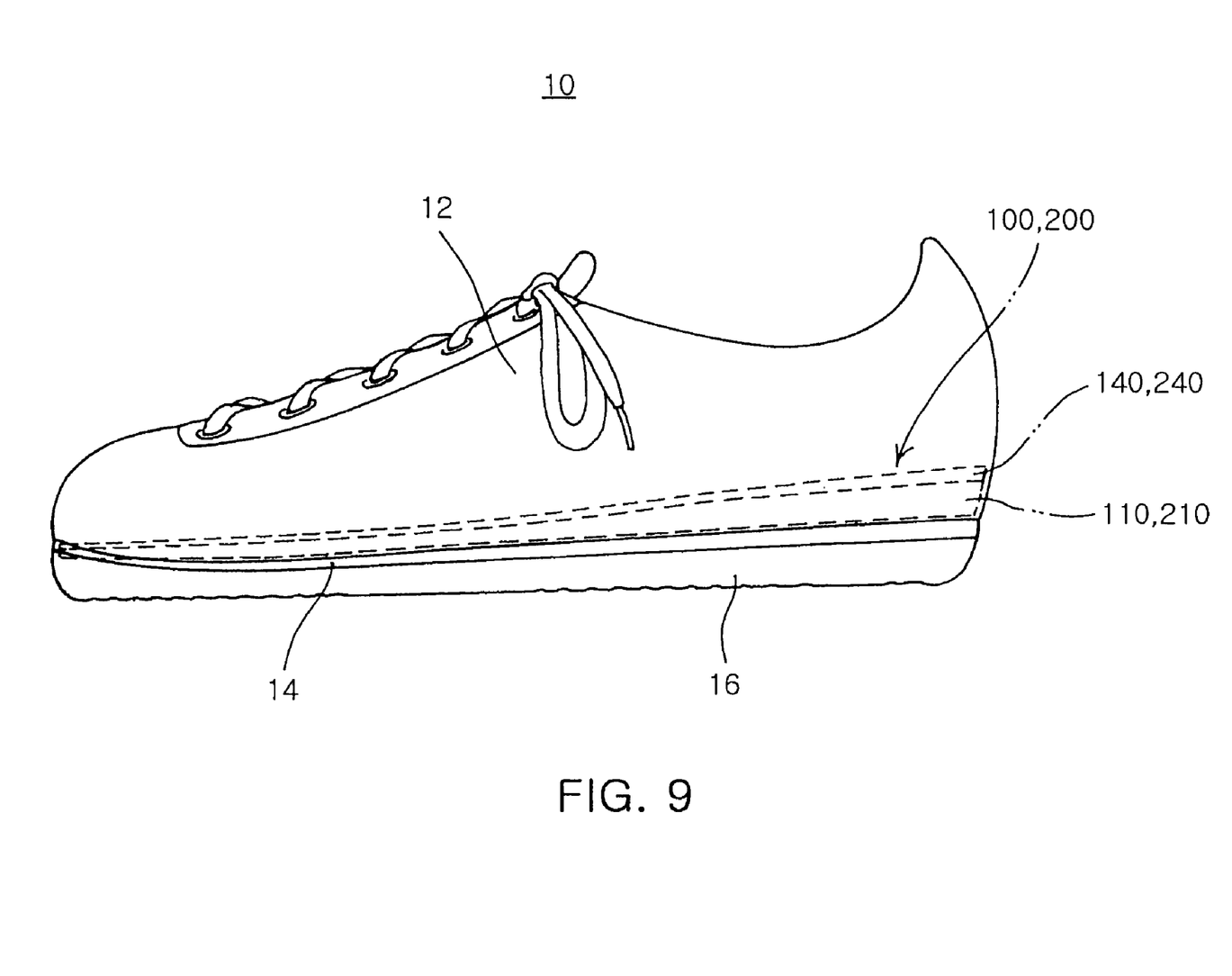
FIG. 9 is a side elevation view of footwear into which the insole assembly of the invention is placed.

FIG. 9 is a side elevation view of footwear or a shoe into which the insole assembly 100 or 200 according to the first or second embodiment of the invention is placed.

As shown in FIG. 9, a shoe 10 includes an upper or body 12 for housing the foot, a midsole 14 for supporting the body 12 and an outsole 16 underlying the midsole 14.

The lower insole 110 or 210 and the upper insole 140 or 240 of the insole assembly 100 or 200 are inserted in their order into the shoe 10 on the midsole 14 to support the foot.

The weight or lower insole 110 or 210 is preferably made with various weights. For example, the lower insoles are fabricated with various weights such as 200, 400, 600 and 900 g so that a user can select a desirable weight of lower insole to adjust his/her exercise effect.

In fabrication of the footwear, lasts are adjusted according to wide foot, narrow foot and mid-foot of different foot widths. If the lower insoles 110 and 210 are fabricated with various thicknesses, shoes of various widths can be produced without additional fabrication of different lasts for the shoes. That is, users of different foot widths can fit their feet to shoes of the same last by selecting the lower insoles 110 or 210 of suitable thicknesses according to their foot widths. Further, substantially the same effect can be expected by taking the upper insole 140 or 240 out but using only the lower insole 110 or 210.

A fabrication process of a weight or lower insole of the invention is as follows: Natural rubber is mixed with synthetic rubber of nitrile rubber and butadiene rubber, and then with $BaSO_4$ of high specific gravity filler. The mixture is pressed with a roll press to enhance the molecular mass as well as plasticity and viscosity. The pressed mixture is mixed again with ZnO, S, stearic acid, a vulcanizing accelerator, and then pressed again to prepare sheets at a thickness of about 5 mm.

The pressing is performed under the pressure of about 6 to 8 kgf/cm2 at a temperature range of 130 to 160° C. for 5 to 8 mins.

In the sheets prepared as above, an upper sheet preferably has a hardness of about 45 or less, and other sheets preferably an A-type hardness of about 50 to 60, and more preferably, a hardness of about 55. The upper sheet has a relatively lower hardness to absorb the load impact amounting to about 4 to 5 times the wearer's weight, which is applied to the wearer's feet and joints when he/she walks.

These sheets are stacked one atop another with desirable number (typically 4 to 6), loaded into a mold, and heated to form into the shape of an insole.

Then, the insole has a specific gravity of about 2.0 or more and various masses of about 300 to 1200 g according to filler contents at 255 mm size, and thus can be used as weight-increasing means of shoes. For reference, typical shoe insoles have a specific gravity of about 0.4 to 0.6.

Table 1 reports physical properties of the weight insole fabricated in the above process.

TABLE 1

| Test Item | Unit | Result | Test Manual |
| --- | --- | --- | --- |
| Tensile Strength | kgf/cm² | 16 | KS M 6518 |
| Elongation | % | 410 | KS M 6518 |
| Tearing Strength | kgf/cm | 9.2 | KS M 6518 |
| Specific Gravity | | 2.38 | KS M 6518 |
| Hardness (A-type) | Scale | 55 ± 1 | KS M 6518 |
| Elasticity (Steel Ball Drop) | % | 17 | KS M 6518 |

Figure 10:
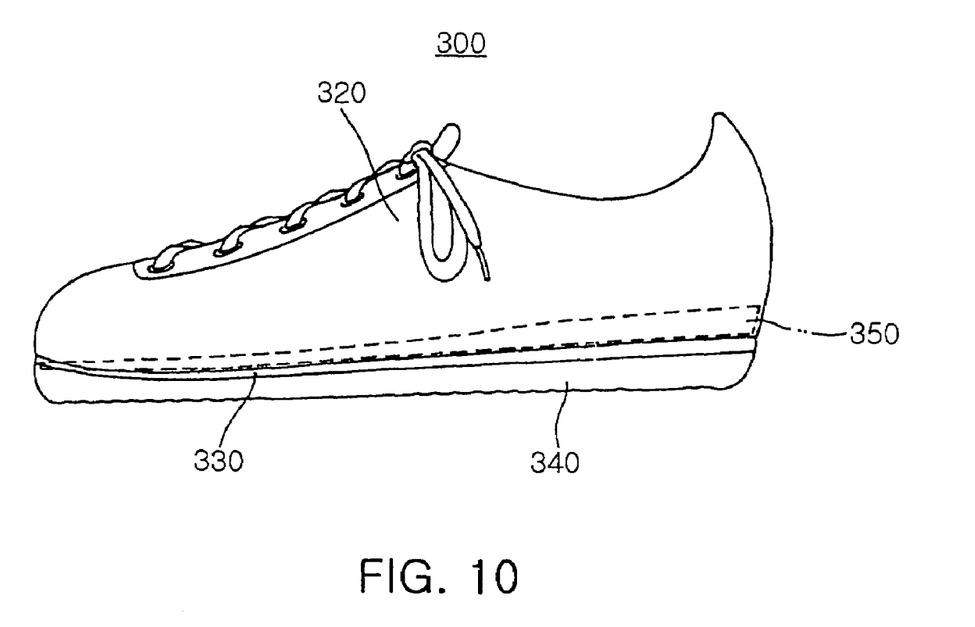
FIG. 10 is a side elevation view of heavy footwear for enhancing the exercise effect according to a third embodiment of the invention.

FIG. 10 is a side elevation view of heavy footwear for enhancing exercise effect according to a third embodiment of the invention. As shown in FIG. 10, heavy footwear or shoe 300 of the invention includes a body 320 of an upper for housing a foot, a midsole 330 connected to the body 320 to support the foot and a bottomsole or outsole 340 underlying the midsole 330. The midsole 330 and the outsole 340 are formed of various materials and with various thicknesses according to the type and use of shoes. Further, an insole 350 (shown in a dotted line) is put on the midsole 330 to provide a cushion to a wearer's foot-sole.

The third embodiment of the invention has technical features of increasing the weight of the shoe 300 by forming the midsole 330 and/or the outsole 340 of the shoe 300 from a compressed resin of a high specific gravity or inserting weight-increasing members made of the high specific gravity compressed resin into the midsole 330 and/or the outsole 340. The high specific gravity compressed resin preferably has a specific gravity of about 2 or more, and contains nitrile rubber, butadiene rubber, barium sulfate ($BaSO_4$) as high specific gravity filler, red lead oxide ($Pb_3O_4$), ZnO, S, stearic acid and vulcanizing accelerator.

Figure 11:
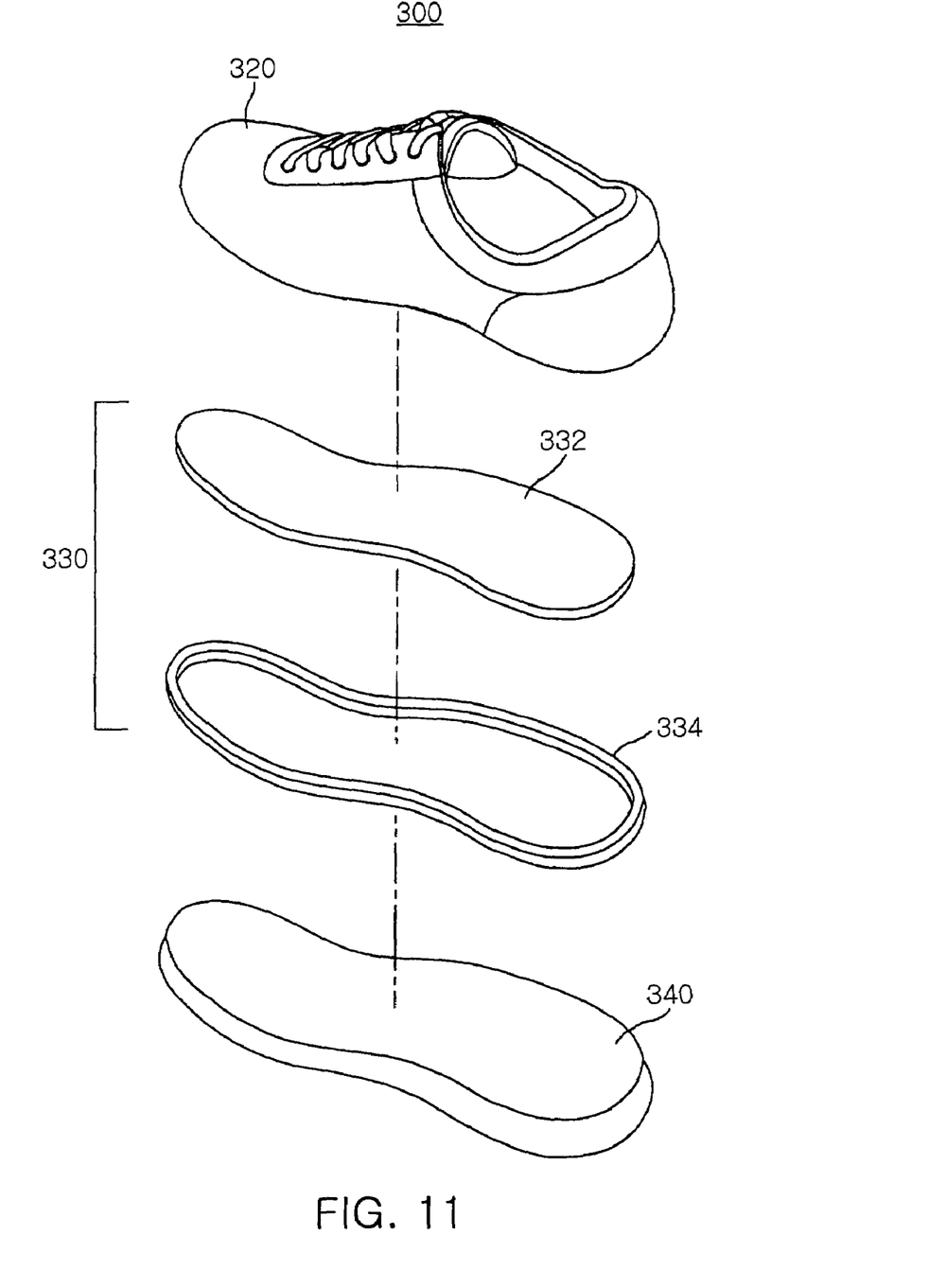
FIG. 11 is an exploded perspective view of the heavy footwear according to the third embodiment of the invention.

FIG. 11 is an exploded perspective view of the heavy footwear or shoe 300 according to the third embodiment of the invention. Referring to FIG. 3, the heavy shoe 300 according to the third embodiment of the invention includes the upper or body 320 for housing a foot, the midsole 330 connected to the body 320 to support the foot and the outsole 340 underlying the midsole 330. The midsole 330 and the outsole 340 are formed of various materials and with various thicknesses according to the type and use of the shoe. Further, the insole 350 put on the midsole 330 for providing a cushion to a wearer's foot-sole is not shown for convenience's sake.

The midsole 330 has a weight-increasing member 332 made of a high specific gravity compressed resin and a shell member 334 for housing the weight-increasing member 332. The weight-increasing member 332 and the shell member 334 can be fabricated as separate pieces before assembled into one via suitable means such as adhesive. Alternatively, the whole midsole 330 can be formed of the high specific gravity compressed resin or rubber.

The weight-increasing member 332 is preferably formed of the compressed resin having a high specific gravity of about 2 or more, and the specific gravity thereof is determined according to a desired weight of the shoe 300 and the thickness of the midsole 330. The high specific gravity compressed resin preferably has a specific gravity of about 2 or more, and contains nitrile rubber, butadiene rubber, $BaSO_4$ as high specific gravity filler, $Pb_3O_4$, ZnO, S, stearic acid and vulcanizing accelerator.

The outsole 340 may be formed of a conventional rubber or synthetic resin, or a wear resistant rubber or synthetic resin in order to prevent easy wearing or tearing.

Figure 12:
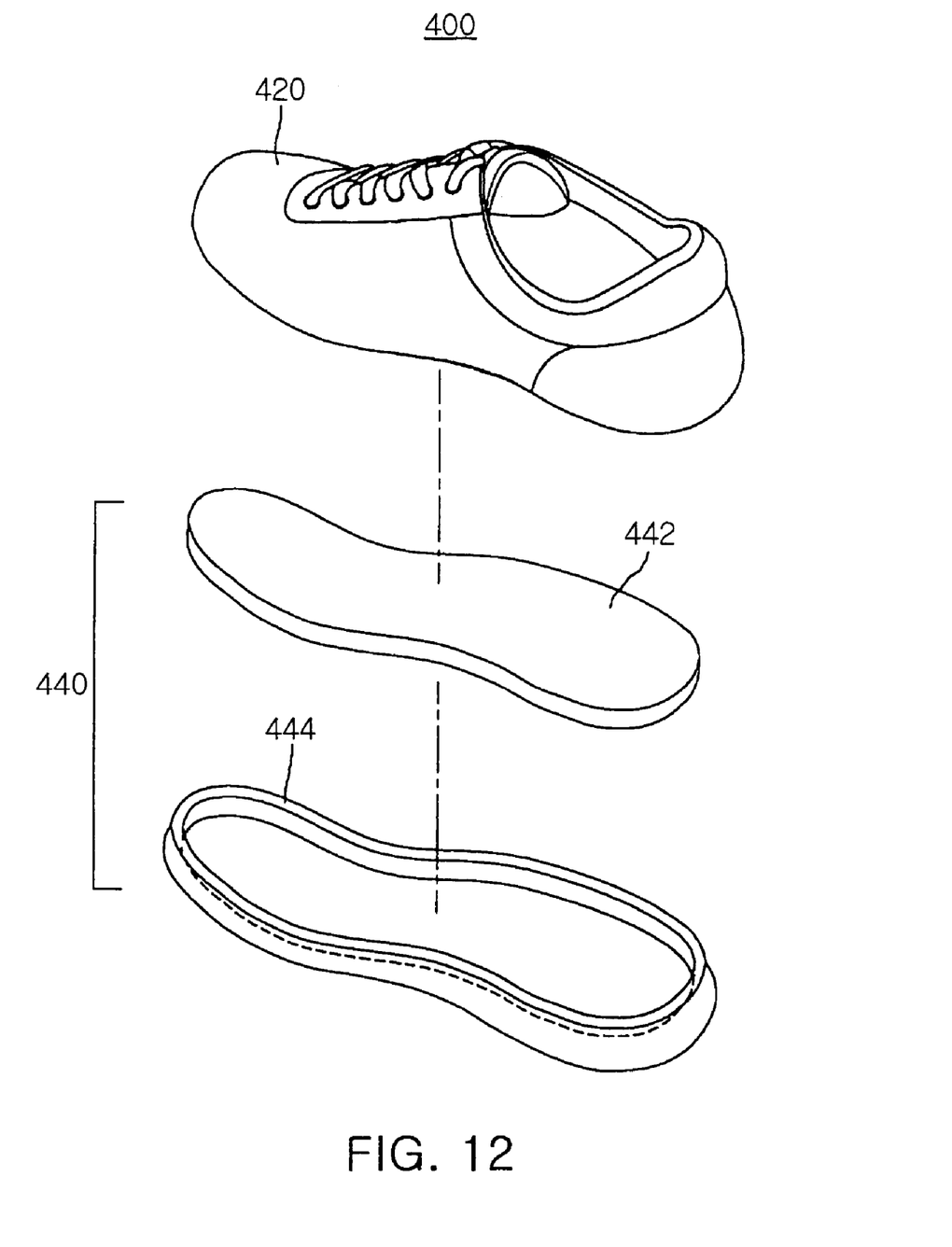
FIG. 12 is an exploded perspective view of heavy footwear according to a fourth embodiment of the invention.

FIG. 12 is an exploded perspective view of a heavy footwear or shoe 400 according to a fourth embodiment of the invention. Referring to FIG. 12, the heavy shoe 400 according to the fourth embodiment of the invention includes a body 420 of an upper for housing a foot and an underlying outsole 440 connected to the body 420 to support the foot. The outsole 440 has a midsole formed integral thereto, and is formed of various materials and with thicknesses according to the type and use of the shoe. Further, an insole put on the outsole 440 for providing a cushion to a wearer's foot-sole is not shown for convenience's sake.

The outsole 440 has a weight-increasing member 442 made of a high specific gravity compressed resin and a shell member 444 for housing the weight-increasing member 442. The weight-increasing member 442 and the shell member 444 can be fabricated as separate pieces before assembled into one via suitable means such as adhesive.

The weight-increasing member 442 is preferably formed of the compressed resin having a high specific gravity of about 2 or more, and the specific gravity thereof is determined according to a desired weight of the shoe 400 and the thickness of the outsole 440. The high specific gravity compressed resin preferably contains nitrile rubber, butadiene rubber, $BaSO_4$ as high specific gravity filler, $Pb_3O_4$, ZnO, S, stearic acid and vulcanizing accelerator. Further, the shell member 444 may be formed of a conventional rubber or synthetic resin, or a wear resistant rubber or synthetic resin in order to prevent easy wearing or tearing.

Alternatively, the whole outsole can be formed of the high specific gravity resin or rubber. That is, the high specific gravity rubber provides not only a large weight but also a high wear resistance, and thus itself can function as an excellent shell member.

Figure 13:
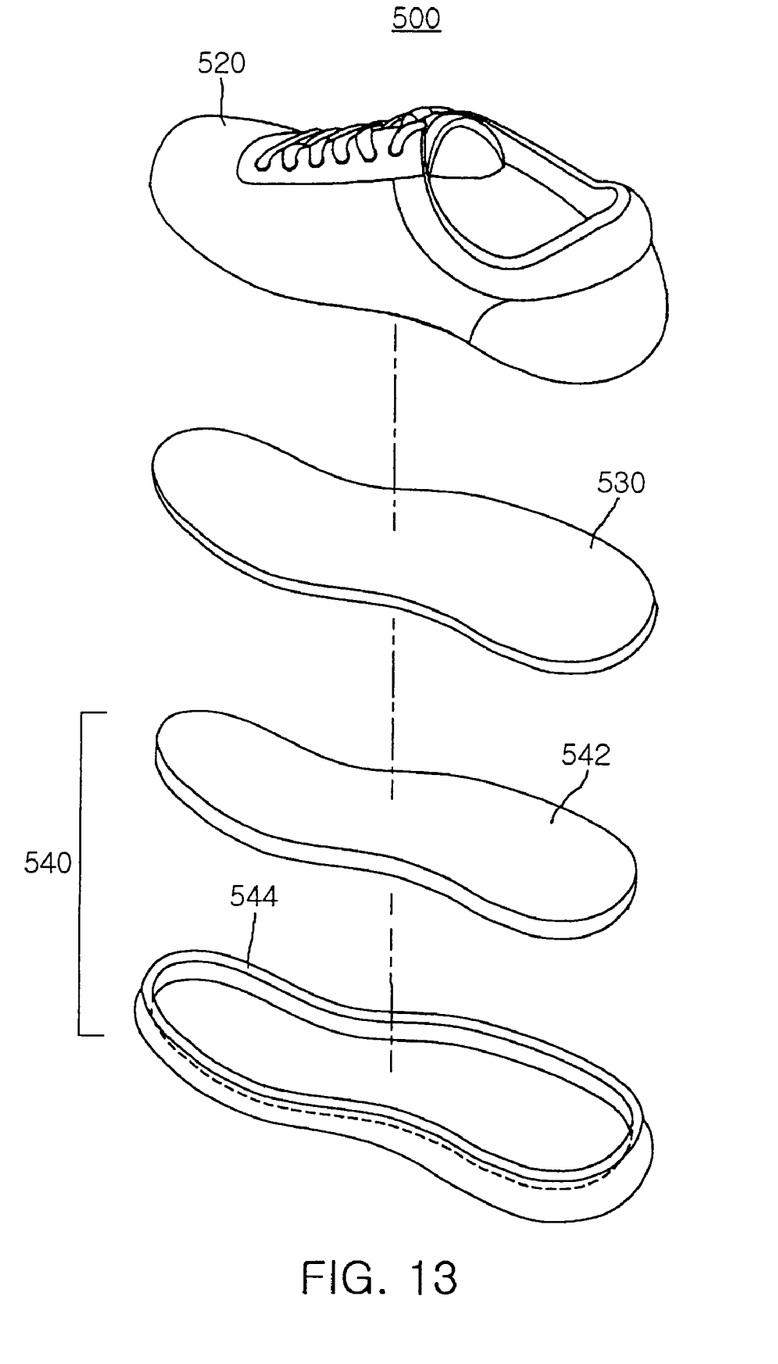
FIG. 13 is an exploded perspective view of heavy footwear according to a fifth embodiment of the invention.

FIG. 13 is an exploded perspective view of heavy footwear or shoe 500 according to a fifth embodiment of the invention. Referring to FIG. 13, the heavy shoe 500 according to the fifth embodiment of the invention includes a body 520 of an upper for housing a foot, an underlying midsole 530 connected to the body 520 to support the foot and a bottom sole or outsole 540 underlying the midsole 530. The midsole 530 and the outsole 540 are formed of various materials and with thicknesses according to the type and use of the shoe. Further, an insole put on the midsole 530 for providing a cushion to a wearer's foot-sole is not shown for convenience's sake.

The outsole 540 has a weight-increasing member 542 made of a high specific gravity compressed resin and a shell member 544 for housing the weight-increasing member 542. The weight-increasing member 542 and the shell member 544 may be fabricated as separate pieces before assembled into one via suitable means such as adhesive.

The weight-increasing member 542 is preferably formed of the compressed resin having a high specific gravity of about 2 or more, and the specific gravity thereof is determined according to a desired weight of the shoe 500 and the thickness of the outsole 540. The high specific gravity compressed resin preferably contains nitrile rubber, butadiene rubber, $BaSO_4$ as high specific gravity filler, $Pb_3O_4$, ZnO, S, stearic acid and vulcanizing accelerator. Further, the shell member 544 may be formed of a conventional rubber or synthetic resin, or a wear resistant rubber or synthetic resin in order to prevent easy wearing or tearing.

Alternatively, the whole outsole can be formed of the high specific gravity resin or rubber. That is, the high specific gravity rubber provides not only a large weight but also a high wear resistance, and thus itself can function as an excellent shell member.

As set forth above, the weight-increasing members made of the high specific gravity resin can be inserted into the outsole and/or the midsole or the whole parts of the outsole and/or the midsole can be made from the high specific gravity compressed resin to increase the weight of the shoe thereby remarkably enhancing the exercise effect of the wearer.

Hereinafter a fabrication process of the midsoles and/or outsoles in use with the heavy shoes according to the third to fifth embodiments of the invention will be described.

Natural rubber is mixed with synthetic rubber of nitrile rubber and butadiene rubber, and then with $BaSO_4$ of high specific gravity filler. The mixture is pressed with a roll press to enhance the molecular mass as well as the plasticity and viscosity. The pressed mixture is mixed again with ZnO, S, stearic acid, a vulcanizing accelerator, and then pressed again to prepare sheets at a predetermined thickness, preferably, at a thickness of about 5 mm.

The pressing is performed under the pressure of about 6 to 8 $kgf/cm^2$ at a temperature range of 130 to 160° C. for 5 to 8 mins.

The sheets are prepared at a hardness of about 45 to 60, preferably, at a hardness of about 50 to 55.

These sheets are stacked one atop another with desirable number, loaded into a mold, and heated to form into the shape of an insole.

The weight-increasing member fabricated as above has a specific gravity of about 2.0 or more and various masses of about 300 to 1200 g according to filler contents at 255 mm size, and thus can be used as weight-increasing means of shoes.

The weight-increasing members fabricated via the above process have physical properties as reported in Table 1 above.

As set forth above, the insole assembly for increasing the weight of footwear such as a shoe according to the invention is made from only synthetic rubber and/or resin to overcome various problems induced from metal elements that are inserted into an outsole and/or an insole of a shoe.

The insole assembly of the invention can also save costs since the mold for the weight-increasing member made of metal is not necessary and an assembly process is simplified.

Because metal is not adopted, the insole assembly of the invention can relieve the wearer from the inconvenience of taking off the footwear or separating metal members when he/she passes through an airport scanner. The footwear does not generate noises during walking although the outsole is partially worn out and thus can prolong its lifetime. Also, the footwear is not soiled since it does not rust even though water-washed for a long time.

In the meantime, natural perfume and herb or medicine powder may be added to the synthetic resin or rubber of the insole to improve foot health.

Further, the heavy footwear according to the invention is made from only synthetic rubber and/or resin to overcome various problems induced from metal elements that are inserted into an outsole and/or an insole of a shoe.

The heavy footwear of the invention can also save costs since the mold for the weight-increasing member made of metal is not necessary and an assembly process is simplified.

Because metal is not adopted, the heavy footwear of the invention can relieve the wearer from the inconvenience of taking off the footwear or separating metal members when he/she passes through an airport scanner. The footwear does not generate noises during walking although th3e outsole is partially worn out, and thus can prolong its lifetime. Also, the footwear is not soiled since it does not rust even though water-washed for a long time.

While the present invention has been shown and described in connection with the preferred embodiments, it will be apparent to those skilled in the art that modifications and variations can be made without departing from the spirit and scope of the invention as defined by the appended claims.

The invention claimed is:

1. An insole assembly (200) used for increasing the weight of a footwear comprising:
    a lower insole (210) made of a compressed resin having a high specific gravity; and
    an upper insole (240) laid on the lower insole (210),
    wherein the lower insole (210) has, in a top surface thereof,
    a front concave portion (214),
    a rear concave portion (218), and
    a plurality of longitudinal grooves (216 for connecting the front concave portions (214) with the rear concave portions (218).

2. The insole assembly according to claim 1, wherein the lower insole (210) is made of a compression molded resin.

3. The insole assembly according to claim 2, wherein the compression molded resin has a specific gravity of at least 2.

4. The insole assembly according to claim 1, wherein the lower insole (210) has longitudinal and lateral grooves (224, 226) formed in an underside (222) thereof and concave portions (228) formed in a central portion of the underside (222) and connected with the longitudinal grooves (228).

5. The insole assembly according to claim 1, wherein the lower insole (210) has a plurality of through holes (220) for connecting a top surface (212) with an underside (222).

6. The insole assembly according to claim 1, wherein the upper insole (240) has an anti-slip projection (252a) in a top front portion thereof.

7. The insole assembly according to claim 1, wherein the upper insole (240) has vent holes (248) perforated vertically in a front portion thereof and projections (250) formed in a bottom front portion thereof.

8. The insole assembly according to claim 1, wherein the upper insole (240) has a convex portion (252) extended longitudinally in a top central portion to support a metatarsus.

9. The insole assembly according to claim 1, wherein the upper insole 240 has a hollow concave portion (242) formed in a bottom rear portion thereof.

10. The insole assembly according to claim 1, wherein the upper insole (240) has a support portion (242) made of a hard resin for preventing the foot of a wearer from twisting and a contact portion made of a thin cloth and laid on the support portion (242).

11. The insole assembly according to claim 1, further comprising a shock-absorbing member (230) attached to a rear end (210b) of the lower insole (210).

* * * * *